United States Patent [19]

Kawabe

[11] Patent Number: 5,095,931
[45] Date of Patent: Mar. 17, 1992

[54] METHOD AND APPARATUS FOR OPENING AND CLOSING MULTI-WAY VALVE

[76] Inventor: Ryu Kawabe, 3-7-301, Nagayama 3-chome, Tama, Japan

[21] Appl. No.: 640,627

[22] Filed: Dec. 21, 1990

[30] Foreign Application Priority Data

Dec. 21, 1989 [JP] Japan .................................. 1-331947
Jul. 17, 1990 [JP] Japan .................................. 2-189235

[51] Int. Cl.⁵ ...................... F16K 11/02; F16K 11/10
[52] U.S. Cl. .................................. 137/1; 137/625.11; 137/863; 251/4; 251/331
[58] Field of Search .................. 137/625, 625.11, 863, 137/1; 251/4, 6, 331

[56] References Cited

U.S. PATENT DOCUMENTS

| | | | |
|---|---|---|---|
| 2,940,474 | 6/1960 | Webster | 251/331 X |
| 2,989,076 | 6/1961 | Rohmann | 251/6 X |
| 3,019,815 | 2/1962 | Lenardon et al. | 251/331 X |
| 3,165,119 | 1/1965 | Hewitt | 251/331 X |
| 3,543,796 | 12/1970 | Durant | 251/331 X |
| 3,757,583 | 9/1973 | Ludewig, Jr. | 251/331 X |
| 4,029,295 | 6/1977 | Wassmer | 251/331 X |

FOREIGN PATENT DOCUMENTS

2752549  6/1979  Fed. Rep. of Germany ...... 251/331

*Primary Examiner*—John Rivell
*Attorney, Agent, or Firm*—Wenderoth, Lind & Ponack

[57] ABSTRACT

The present invention is concerned with method and apparatus for opening and closing a multi-way valve. The present invention discloses method and apparatus for controlling the flow of fluid into a plurality of fluid distributing pipes, wherein an elastic wall which constitutes a fluid passage is opened and closed in plural positions by the application of an external pressure to provide communication between only predetermined fluid distributing pipes out of plural fluid distributing pipes connected to the fluid passage.

14 Claims, 8 Drawing Sheets

METHOD AND APPARATUS FOR OPENING AND CLOSING MULTI-WAY VALVE

BACKGROUND OF THE INVENTION

1. Field of the Invention

The present invention relates to method and apparatus for opening and closing a multi-way valve wherein a fluid passage is opened or closed in plural positions to thereby permit communication or 1 interception of the fluid passage in any desired directions of plural fluid distributing pipes connected to the fluid passage.

2. Description of Prior Art

According to the construction of a conventional, known multi-way assembly, radial fluid distributing pipes are connected to a cylindrical valve housing, and a valve member having through communication holes formed in various directions is fitted into the cylindrical valve housing and is rotated for communication with a predetermined fluid distributing pipe.

SUMMARY OF THE INVENTION

According to the above conventional construction, it is required to form communication holes lengthwise and crosswise in the valve member, so the number and diameter of the holes are greatly restricted and actually there is a problem that at the same height a three-way valve is a limit. Besides, in the case of a proximate arrangement of communication holes, special consideration is needed with respect to sealing.

In the present invention, fluid distributing pipes are radially provided contiguously to an annular fluid passage, or fluid distributing pipes are provided contiguously and at an angle to a rectilinear fluid passage, and an elastic cover having an arcuate section is attached to the fluid passage, then the elastic cover is pressed to intercept or communicate the annular or rectilinear fluid passage. Also, according to the present invention, fluid distributing pipes are radially attached to an annular fluid passage formed by an elastic pipe, or fluid distributing pipes are attached at an angle to a rectilinear fluid passage formed by an elastic pipe, then the annular or rectilinear fluid passage is pressed to intercept or communicate the fluid passage. In this way there have been completed method and apparatus for opening and closing a multi-way valve, relatively simple in structure, ensuring sealing and little restricted in its construction.

More specifically, in a method of controlling the flow of fluid into a plurality of fluid distributing pipes by opening and closing a fluid passage in plural positions, the present invention relating to a method resides in a multi-way valve opening and closing method characterized in that an elastic wall which constitutes a part of the fluid passage is deformed by an external pressure to intercept the fluid flow in the deformed portion, allowing communication of only predetermined sets of fluid distributing pipes. The elastic wall is deformed continuously along the fluid passage. Further, the fluid passage is formed rectilinearly or annularly, constituted by an elastic wall.

The present invention relating to an apparatus is a multi-way valve opening and closing apparatus characterized in that a plurality of fluid distributing pipes are radially connected to an annular fluid passage in suitable positions; the upper surface of the annular fluid passage is covered with an elastic cover having an arcuate section; and rolling rolls for depressing the elastic cover to intercept the annular fluid passage are mounted through arms to a handle shaft which is erected rotatably mounted at a central part of the annular fluid passage.

According to a further aspect of the present invention there is provided a multi-way valve opening and closing apparatus characterized in that a plurality of fluid distributing pipes are connected radially to an annular fluid passage in suitable positions; the upper surface of the annular fluid passage is covered with an elastic cover having an arcuate section; and a plurality of pressing members for depressing the elastic cover to intercept the annular fluid passage are mounted through arms to a handle shaft which is mounted rotatably mounted at a central part of the annular fluid passage, the handle shaft being adapted to be urged downwards for vertical movement. The downward urging of the handle shaft is effected by the resilient force of a spring. The pressing members are mounted vertically movably on plural arms which are radially attached to the handle shaft.

According to a still further aspect of the present invention there is provided a multi-way valve closing apparatus characterized in that an annular fluid passage formed by an elastic pipe is supported on a pressure resisting support; a plurality of fluid distributing pipes are radially connected to the annular fluid passage in suitable positions; and pressing means for intercepting the annular fluid passage in a successive manner is provided. According to the construction of the pressing means, pressing members are mounted on a handle shaft which is mounted centrally of the annular fluid passage, the handle shaft being rotatably or vertically movably mounted.

In a still further aspect of the present invention there is provided a multi-way valve opening and closing apparatus characterized in that a plurality of fluid distributing pipes are connected at an angle to a rectilinear fluid passage in suitable positions, the fluid passage being formed in the shape of a concave arc in section; the upper surface of the fluid passage is covered with an elastic cover having a convex arc-shaped section symmetrically with respect to the concave arc-shaped section; and a plurality of rolling rolls for depressing the elastic cover to intercept the fluid passage are mounted rollably along the fluid passage and horizontally movably at predetermined intervals to open and close the fluid passage portion between the fluid distributing pipes.

In a still further aspect of the present invention there is provided a multi-way valve opening and closing apparatus characterized in that a plurality of fluid distributing pipes are connected at an angle to a rectilinear fluid passage having a concave arc-shaped section; the upper surface of the fluid passage is covered with an elastic cover having a convex arc-shaped section symmetrically with respect to the concave arc-shaped section; and a plurality of pressing members for depressing the elastic cover to intercept the fluid passage are vertically movably to mounted on a rod member which is movably horizontally along the fluid passage, the plural pressing members being disposed at predetermined intervals to open and close the fluid passage portion between the fluid distributing pipes.

In a still further aspect of the present invention there is provided a multi-way valve opening and closing apparatus characterized in that a plurality of fluid distributing pipes are connected to a rectilinear fluid passage formed by an elastic pipe and mounted on a pressure-resisting support, and a plurality of pressing means for deforming the fluid passage under pressure to intercept the same passage are mounted rollably along the fluid passage and at predetermined intervals to open and close the fluid passage portion between the fluid distributing pipes. The pressing means comprise rolls mounted rollably.

In the above multi-way valve opening and closing apparatus, since the fluid distributing pipes are all communicated with one another through the annular fluid passage, a desired flow path can be constituted by pressing the elastic cover in a suitable position to intercept the fluid passage. For intercepting the fluid passage, in addition to the rolling of rollers or pressure contact of pressing members with the elastic cover, there also may be adopted known cover deforming means so that only the elastic cover is deformed under pressure.

According to the present invention, a plurality of fluid distributing pipes are connected to a rectilinear or annular fluid passage in suitable positions and the upper surface of the fluid passage is covered with an elastic cover having an arcuate section, then the elastic cover is pressed or released to communicate or intercept the rectilinear or annular fluid passage. Also, according to the present invention, a plurality of fluid distributing pipes are connected to a rectilinear or annular fluid passage formed by an elastic pipe, and the fluid passage is pressed or released for communication or interception thereof. Thus, according to the present invention, plural fluid passages can be controlled by the operation of a single valve shaft and so it is possible to provide flow control in various direction by a simple operation. Moreover, sealing between plural fluid passages during interception can be effected easily and positively. Further, since the operation is simple, not only manual operation but also electric operation of the valve shaft can be carried out to facilitate remote control, and thus the valve is effective also when said in a fully-automatic chemical plant or the like.

BRIEF DESCRIPTION OF THE DRAWINGS

FIGS. 1 to 5 illustrate a first embodiment of the present invention, of which:

FIGS. 6 and 7 illustrate a second embodiment of the present invention, of which:

FIGS. 8 to 14 illustrate a third embodiment of the present invention, of which:

FIGS. 15 to 19 illustrate a fourth embodiment of the present invention of which:

DESCRIPTION OF PREFERRED EMBODIMENTS

Preferred embodiments of the present invention will be described hereinunder with reference to the accompanying drawings. It is to be understood that the present invention is not limited to the following embodiments.

Embodiment 1

An embodiment of the present invention will now be described with reference to FIGS. 1 to 5. A plurality of fluid distributing pipes $2a$, $2b$, $2c$, $2d$ and $2e$ are radially connected to an annular fluid passage 1 having a concave arc-shaped section, and the upper surface of the annular fluid passage 1 is covered with an annular rubber cover 3 having a convex arc-shaped section in a hermetically sealed state. Centrally of the annular fluid passage 1 is a valve shaft 4 rotatably and vertically mounted (FIG. 2), and a pressing means carrier in the form of a boss 7 of arms 6 with pressing means in the form of press rolls $5a$, $5b$, $5c$ and $5d$ mounted therein is fitted and fixed onto the valve shaft 4.

Figure 1:
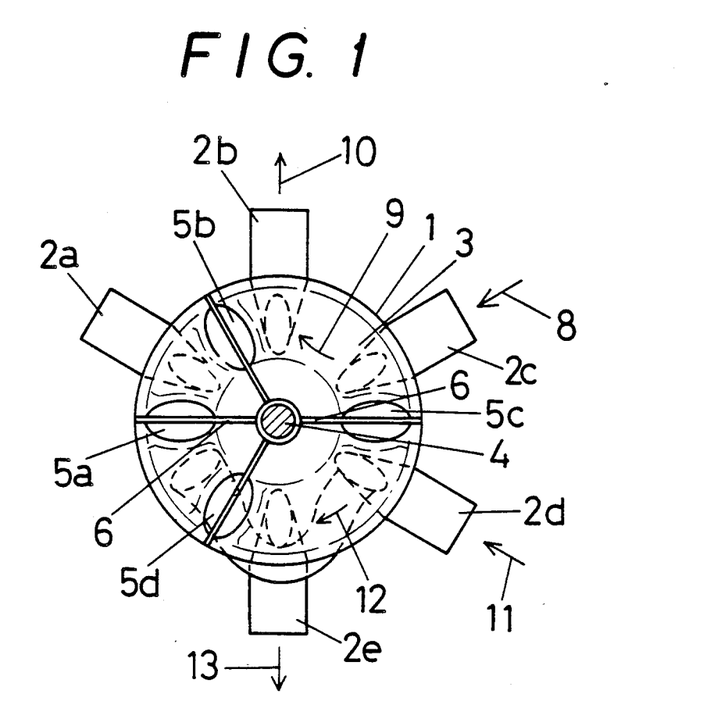
FIG. 1 is a partial plan view.
Figure 2:
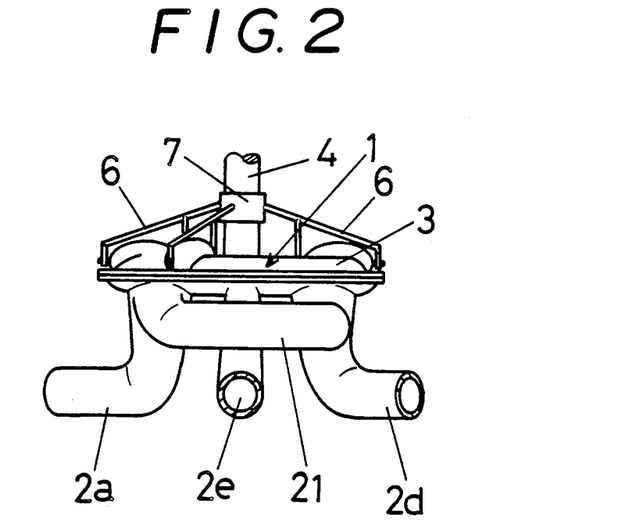
FIG. 2 is a front view thereof.

In this embodiment, when the arms 6 are lowered to press the press rolls $5a$–$5d$ against cover 3 to close fluid passage 1, the press rolls $5a$ and $5b$ are in circumferential positions on the opposite sides of the fluid distributing pipe $2a$, the press rolls $5b$ and $5c$ are in circumferential positions such that the fluid distributing pipes $2b$ and $2c$ lie between them, and the press rolls $5c$ and $5d$ have the fluid distributing pipes $2d$ and $2e$ between them, as shown in FIG. 1, fluid flows from the fluid distributing pipe $2c$ or $2d$ into the annular fluid passage 1 and then into the fluid distributing pipe $2b$ and $2e$, as indicated by arrows 8, 9 and 10, or 11, 12 and 13.

Figure 3:
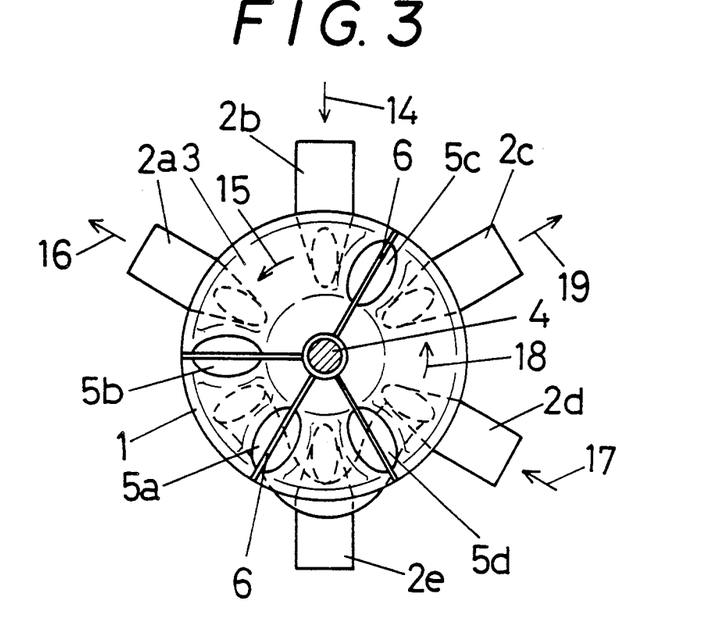
FIG. 3 is a plan view with a valve shaft rotated 60° from the position of FIG. 1.

In FIG. 3, the shaft has been rotated counterclockwise by 60° from FIG. 1, and press rolls $5b$ and $5c$ have the fluid distributing pipes $2a$ and $2b$ therebetween and the press rolls $5c$ and $5d$ have the fluid pipe $2c$ and $2d$ therebetween, so fluid flows from the fluid distributing pipe $2b$ or $2d$ into the fluid distributing pipe $2a$ or $2c$ through the annular fluid passage 1, as indicated by arrows 14, 15 and 16, 17, 18 and 19.

Figure 4:
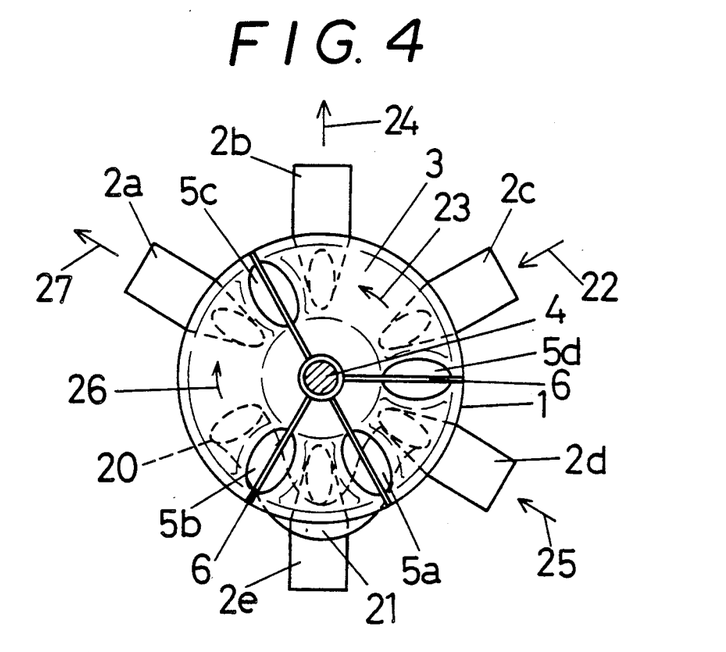
FIG. 4 is a plan view with the valve shaft rotated 120° from the position of FIG. 1.
Figure 5:
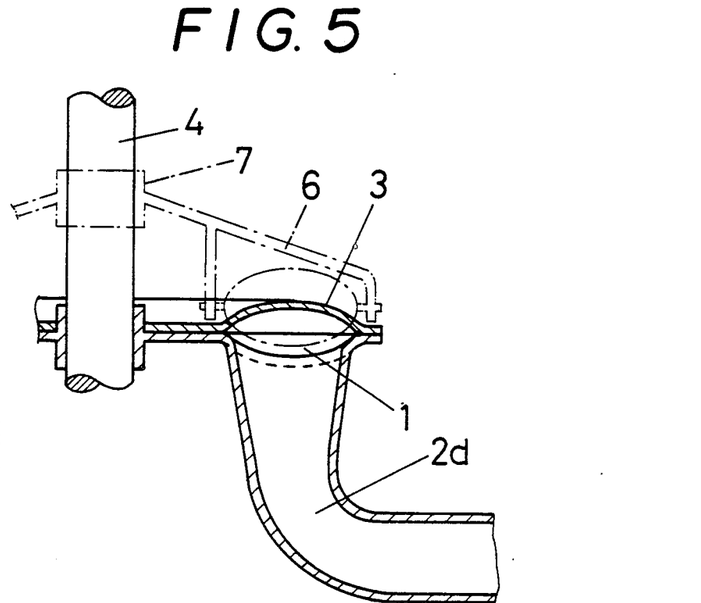
FIG. 5 is a partial sectional view on an enlarged scale.

In FIG. 4, the shaft has been rotated counterclockwise by 120° from FIG. 1, and press rolls $5b$ and $5c$ have the fluid distributing pipe $2a$ therebetween, the press rolls $5c$ and $5d$ have the fluid distributing pipes $2b$ and $2c$ therebetween, and the press rolls $5a$ intercepts the annular fluid passage 1 portion positioned between the fluid distributing pipes $2d$ and $2e$. In this case, the fluid distributing pipe $2a$ and an opening 20 the annular fluid passage are interconnected through a connecting pipe 21, s fluid flows as shown by arrows 22, 23 and 24, or 25, 26 and 27.

The flowing direction of the fluid can be changed by setting the angle of rotation of the valve shaft 4 at 0° (FIG. 1), 60° (FIG. 3) and 120° (FIG. 4).

The rotation of the valve shaft 4 can be done not only manually but also electrically.

Embodiment 2

Another embodiment of the present invention will now be described with reference to FIGS. 6 and 7. In this embodiment, pressing members are used as pressing means, in place of the press rolls used in the embodiment 1 although the annular fluid passage 1 and the fluid distributing pipes 2a, 2b, 2c, 2d, 2e are the same as those used in the embodiment 1. More specifically, in FIG. 6, a boss 7 of arms 6 is fitted and fixed onto a valve shaft 4, and pressing members 28a and 28b having an arcuate section (downwardly convex) are fixed to the lower ends of the arms 6. The valve shaft 4 is mounted centrally of a valve housing 30 so as to be movable vertically, and a spring 31 is interposed between a spring shoe 29 fixed to the lower end of the valve shaft 4 and a lower wall of the valve housing 30. The reference numeral 32 in the same figure denotes a handle.

Figure 7:
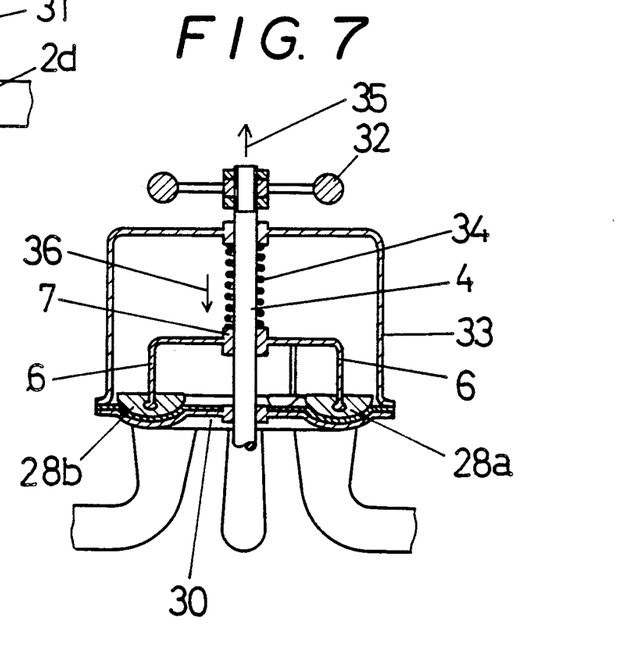
FIG. 7 is a sectional view of another example also using a spring.
Figure 8:
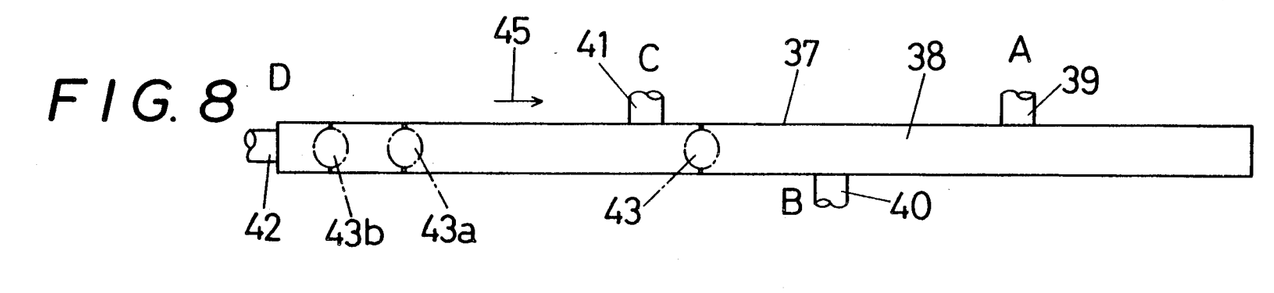
FIGS. 8 to 12 are partial plan views showing the operation of this embodiment, FIG. 8 being a connection diagram to connection of A-B fluid distributing pipes, FIG. 9 a connection diagram for connection of C-B fluid distributing pipes, FIG. 10 a connection diagram for connection of A-B fluid distributing pipes and fluid distributing pipe C-fluid passage D, FIG. 11 a connection diagram partial of fluid distributing pipe C-fluid passage D, and FIG. 12 for a wholly closed system.
Figure 9:
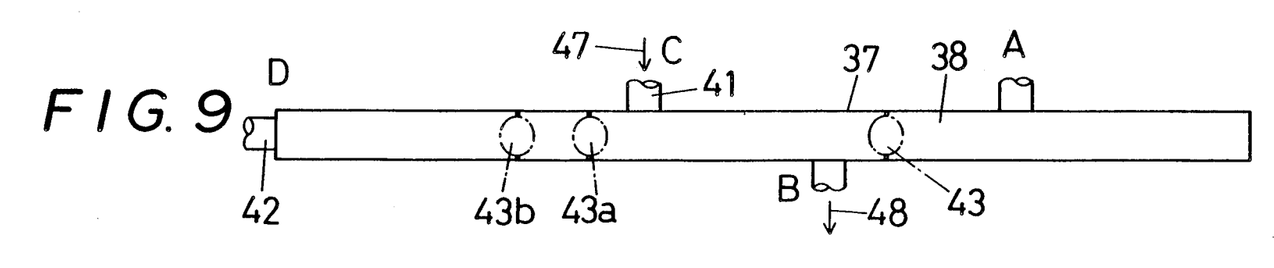
Figure 10:
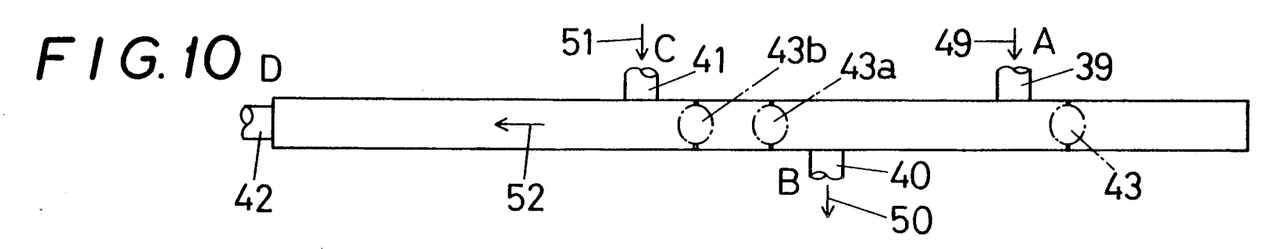
Figure 11:
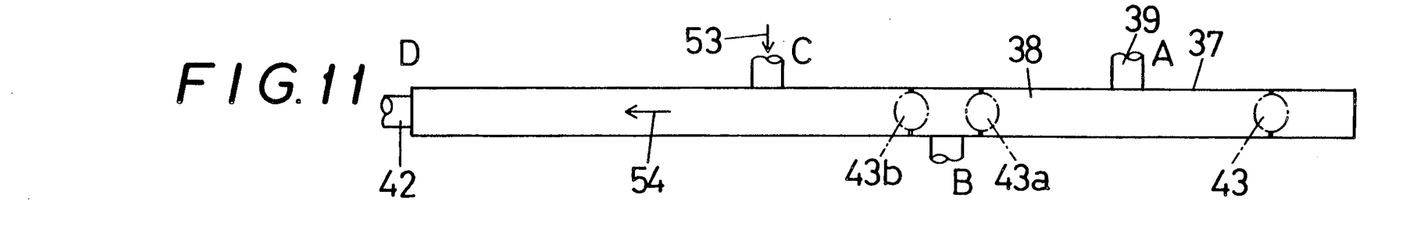
Figure 12:
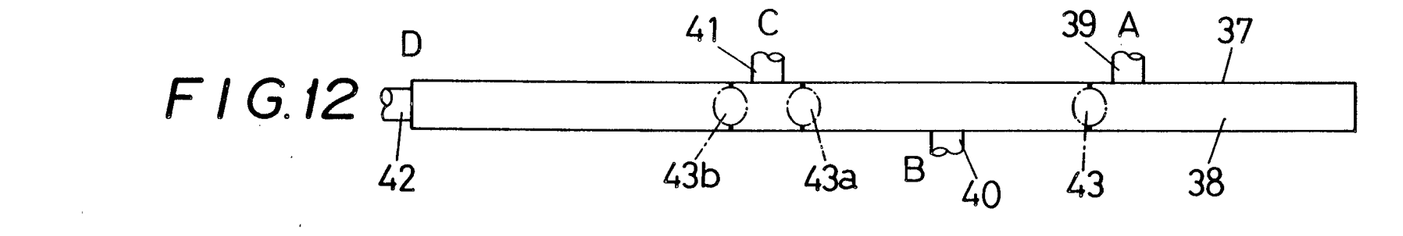
Figure 13:
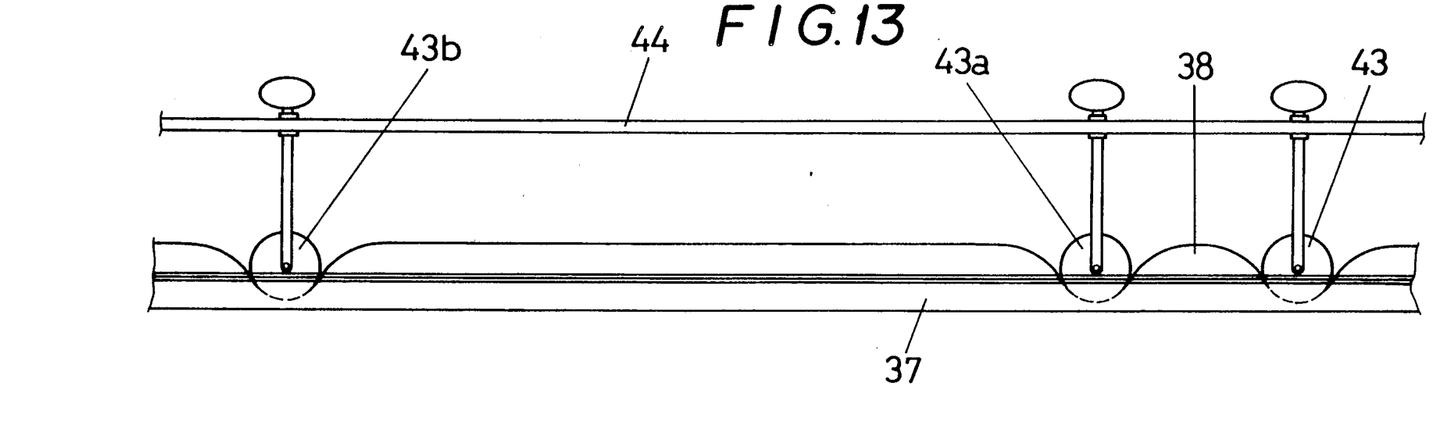
FIG. 13 is a partially omitted front view of FIG. 8.
Figure 14:
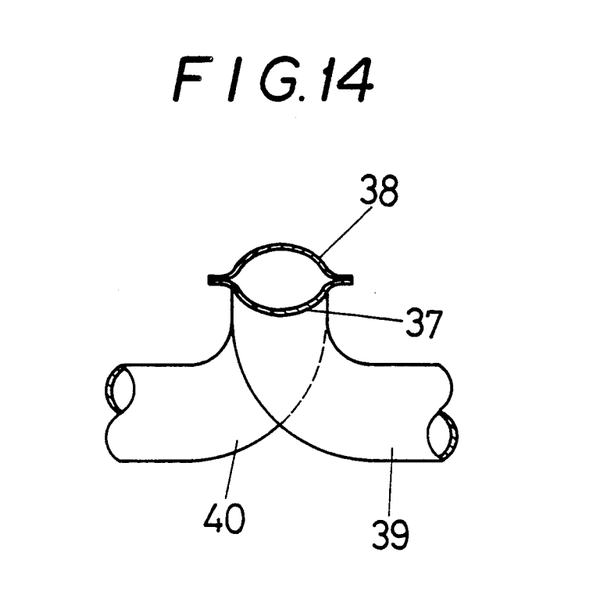
FIG. 14 is a side view of FIG. 8.

In FIG. 7, a housing cover 33 is mounted over the valve housing 30, and the valve shaft 4 extends through both the valve housing 30 and the housing cover 33. Further, a spring 34 is fitted on the valve shaft 4 portion positioned between the boss 7 of the arms 6 and the housing cover 33.

Figure 6:
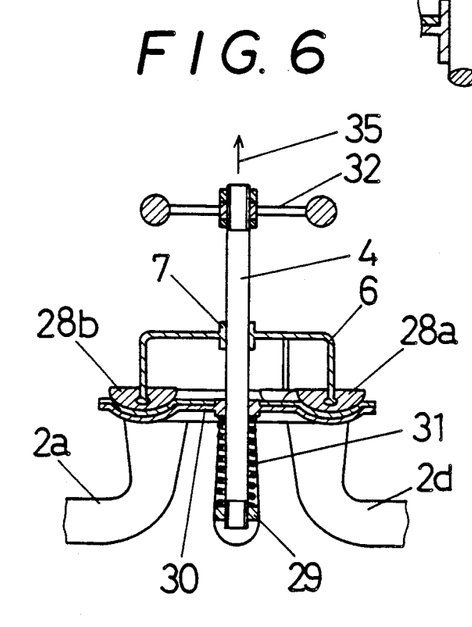
FIG. 6 is a sectional view of one example using a spring.

In both FIGS. 6 and 7, if the handle 32 is pulled up in the direction of arrow 35, then the valve shaft 4 is rotated a predetermined angle and thereafter the handle 32 is released, the pressing members 28a and 28b descend to predetermined positions in the direction of arrow 36, thus causing the rubber cover 3 to be deformed downwards, whereby the annular fluid passage 1 can be intercepted. In this case, the state of communication of the fluid distributing pipes is the same as in the embodiment 1, so an explanation about the flow of fluid is here omitted.

Embodiment 3

A further embodiment will now be described with reference to FIGS. 8 to 14. As shown in these figures, a rectilinear fluid passage 37 having a concave arc-shaped section is covered with a rubber cover 38 having a convex arc-shaped section in a sealed state, and fluid distributing pipes 39, 40, 41 and 42 are connected to the fluid passage 37 in side positions A, B, C and D. Pressing means in the form of press rolls 43, 43a and 43b of a shape capable of pressing and deforming the rubber cover 38 and thereby intercepting the fluid passage 37 are in rollable abutment with the upper surface of the rubber cover 38. The press rolls 43, 43a and 43b are fixed to a pressing means carrier in the form of single rod 44, so move in the direction indicated by arrow 45 in FIG. 8, and when they reach the respective positions shown in FIG. 8, fluid flows as shown by and 48 in FIG. 9. Further, when these press rolls roll to the respective positions shown in FIG. 10, fluid flows as shown by arrows 49 and 50, or 51 and 52. In their positions shown in FIG. 11, fluid flows as shown by and 54, and in their positions shown in FIG. 12, the fluid passage is wholly blocked off.

In this embodiment, since the fluid passage is disposed rectilinearly and the press rolls are positionally changed by rolling motions, there is no fear of fluid leakage into the other fluid distributing pipes even at the time of change-over.

In place of the above rolling rolls, pressing members of a shape capable of pressing and deforming the rubber cover 38 to intercept the fluid passage 37 may be attached vertically movably to a rod which is movable horizontally along the fluid passage, whereby the fluid passage can be opened and closed.

Embodiment 4

Figure 15:
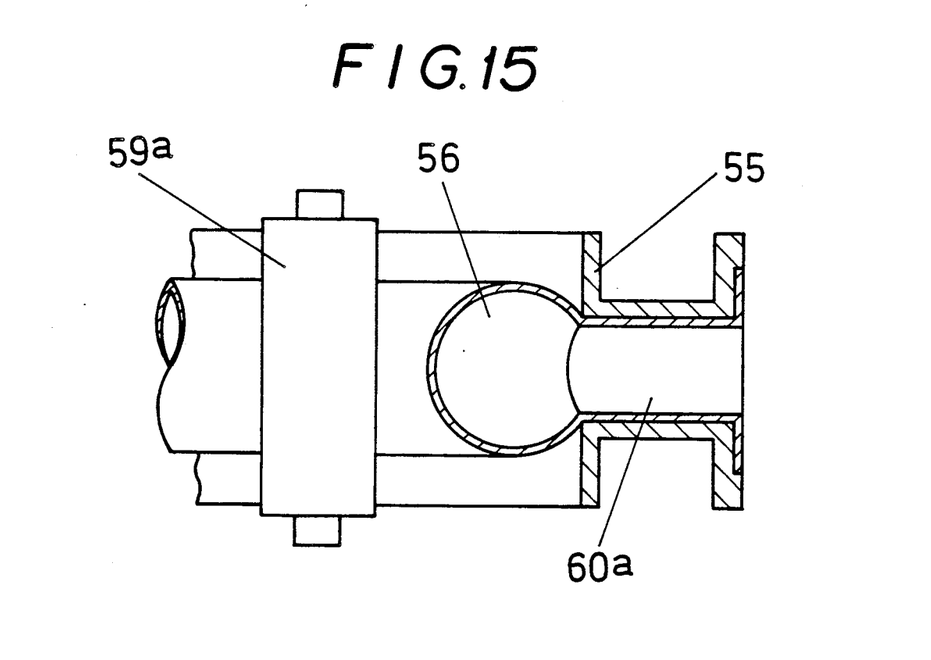
FIG. 15 is a partial enlarged, vertical sectional view showing the connection between a fluid distributing pipe and an elastic pipe.
Figure 16:
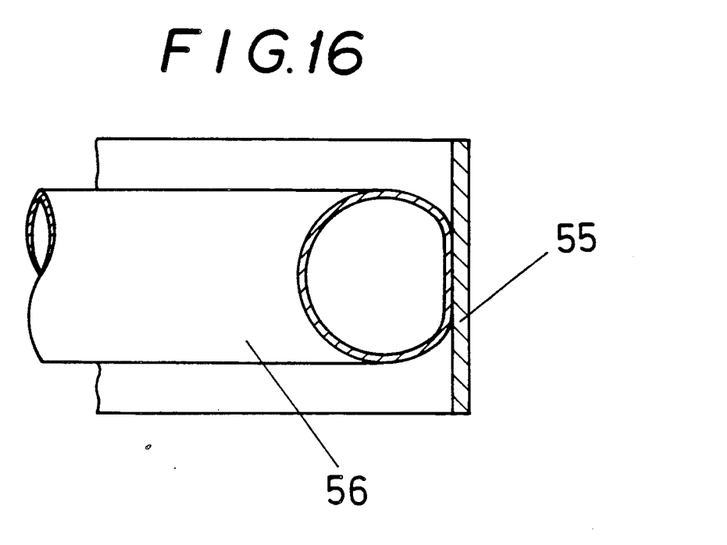
FIG. 16 is an enlarged sectional view showing a mounted state of the elastic pipe.
Figure 17:
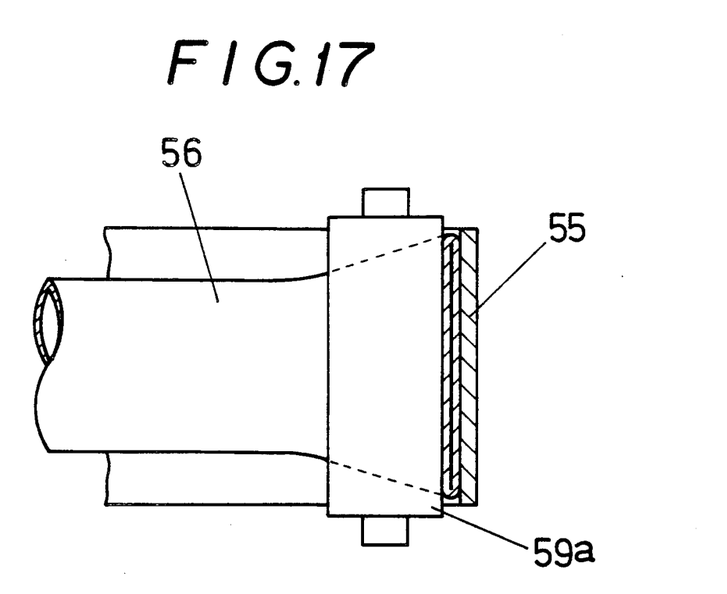
FIG. 17 is an enlarged, vertical sectional view showing a press-intercepted state.
Figure 18:
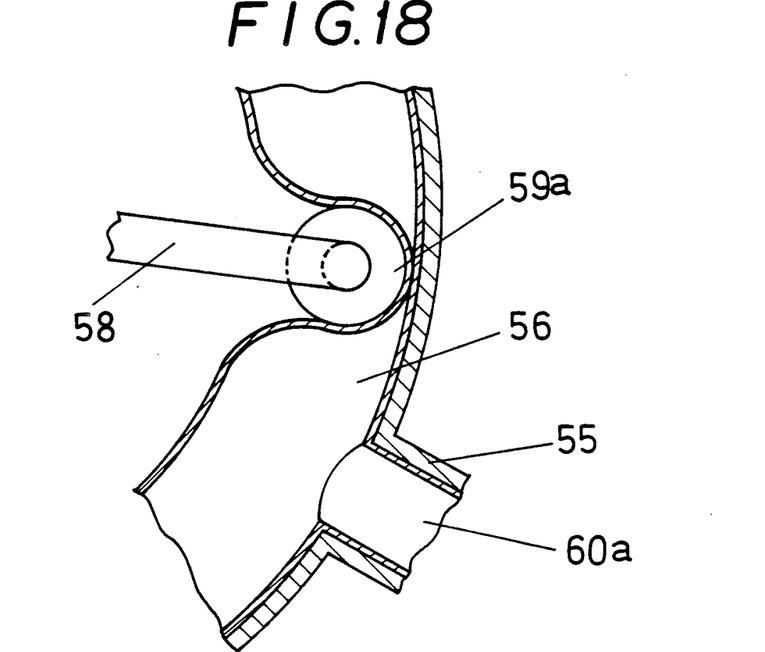
FIG. 18 is an enlarged, cross-sectional view showing an intercepted state near the fluid distributing pipe.
Figure 19:
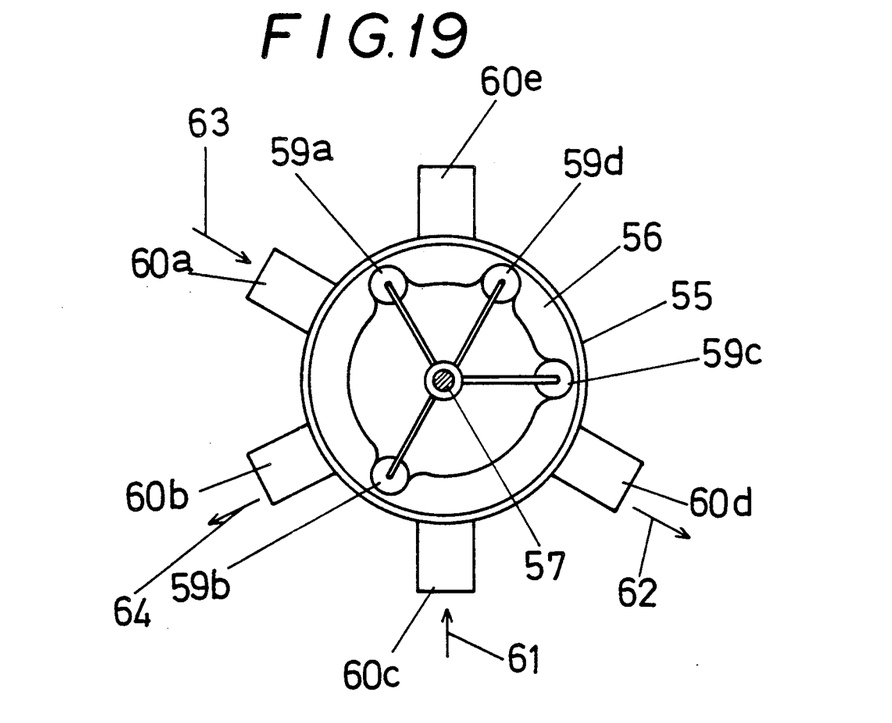
FIG. 19 is a plan view thereof.

A still further embodiment of the present invention will now be described with reference to FIGS. 15 to 19. An annular elastic pipe 56 is disposed inside an annular support 55 having a plane inner surface, and a rotary shaft 57 is rotatably mounted in the center of elastic pipe 56. Further, arms 58 are radially projected from the rotary shaft 57, and press rollers 59a, 59b, 59c and 59d are mounted rotatably on the outer ends of the arms 58. The press rollers 59a, etc. are in a pressurized state to the extent that the elastic pipe 56 is be rendered flat to intercept the flow of fluid. To the elastic pipe 56 are connected fluid distributing pipes 60a, 60b, 60c, 60d and 60e at predetermined intervals. In FIG. 19, communication is provided between the fluid distributing pipes 60a and 60b and also between 60c and 60d, and fluid flows in the direction of arrows 61 and 62, also in the direction arrows 63 and 64. In this case, the elastic pipe 56 and the fluid distributing pipe 60a are interconnected as shown in FIG. 15, and the elastic pipe 56 and the support 55 are fixed in abutment with each other as in FIG. 16, so that the portion of the elastic pipe 56 with which the press roller 59a is in abutment FIGS. 17 and 18.

Although an annular elastic pipe has been described above, the same arrangement as above is also applicable to a rectilinear elastic pipe. In this case, a plurality of fluid distributing pipes are connected to a rectilinear fluid passage formed by an elastic pipe, in suitable positions, and the fluid passage is mounted on a pressure-resisting support. Further, a plurality of pressing means for pressing and deforming the fluid passage to intercept the flow of fluid are mounted movably along the fluid passage The plural pressing means are disposed at predetermined intervals to open and close the fluid passage portion between the fluid distributing pipes. The fluid passage opening and closing operation of the pressing means is as described previously, and will not be explained here. In this case, the pressing means may be rollable rolls.

What is claimed is:

1. A method of controlling flow of fluid between a plurality of fluid conduits having ends at fixed positions spaced from each other and connected by a fluid passage means having at least a part of which is elastic which can be deformed for blocking said fluid passage means, comprising the steps of:

moving a plurality of pressing means along said fluid passage means to positions intermediate selected ones of said fluid conduits; and pressing said pressing means against the elastic part of said fluid passage means for deforming said fluid passage means to block said fluid passage means between the selected ones of said fluid conduits so as to prevent passage of fluid past said pressing means and leaving the remainder of said fluid passage means which is not pressed by said pressing means open for the flow of fluid through said fluid passage means other than at said positions.

2. A method as claimed in claim 1 in which said fluid passage means is annular and said step of moving comprises moving said pressing means circumferentially along the annular fluid passage means.

3. A method as claimed in claim 1 in which said fluid passage means is rectilinear and said step of moving comprises moving said pressing means linearly along said rectilinear fluid passage means.

4. A method as claimed in claim 1 in which only a pat of the cross-section of said fluid passage means is elastic, and said step of pressing comprises pressing said pressing means against said elastic part of said fluid passage means for pressing the elastic part against the remainder of said fluid passage means for completely blocking off said fluid passage means.

5. A method as claimed in claim 1 in which the entire cross-section of said fluid passage means is elastic, and said step of pressing comprises pressing said pressing means against said elastic part of said fluid passage means for pressing opposite parts of the wall of said fluid pressing means against each other for completely blocking off said fluid passage means.

6. A multi-way valve comprising:
a fluid passage means having at least a part thereof which is elastic which can be deformed for blocking said fluid passage means;
a plurality of fluid conduits having ends thereof connected into said fluid passage means at positions spaced along the length of said fluid passage means;
a plurality of pressing means engagable with said fluid passage means for deforming the elastic part thereof for blocking said fluid passage means; and
a pressing means carrier on which said pressing means are mounted at intervals, the interval between at least two of said pressing means being greater than the distance between at least two adjacent fluid conduits and less than the interval between the next two fluid conduits past the respective fluid conduits of said at least two conduits, said pressing means carrier being movable for moving said pressing means along said fluid passage means to positions other than the positions of said fluid conduits, whereby said pressing means can be moved to move said at least two pressing means to positions to block off said fluid conduit in directions other than between said at least two adjacent fluid conduits.

7. A multi-way valve as claimed in claim 6 in which said fluid passage means is an annular fluid passage means and said fluid conduits extend radially therefrom.

8. A multi-way valve as claimed in claim 7 in which said fluid passage means is a fluid passage conduit having a hollow cross-section with a downwardly concave rigid pat and an upwardly convex elastic pat, and said pressing means comprise rollers having a convex profile corresponding to the shape of the downwardly concave rigid part and engaged in said downwardly concave rigid part for completely blocking off said cross-section and rolling in said downwardly concave rigid part for movement along said fluid passage conduit.

9. A multi-way valve as claimed in claim 8 in which said pressing means carrier comprises a vertical shaft in the center of said annular fluid passage conduit, a plurality of arms rotatably mounted on said vertical shaft and extending outwardly to said fluid passage conduit, said rollers being mounted on the ends of said arms, at least two of said arms being spaced to have only two adjacent fluid conduits therebetween.

10. A multi-way valve as claimed in claim 7 in which said fluid passage means is a fluid passage conduit having a hollow cross-section with a downwardly concave rigid part and an upwardly convex elastic pat, and said pressing means comprise pressing members having a convex profile corresponding to the shape of the downwardly concave rigid part and movable toward and away from said fluid passage conduit for engaging said pressing members in said downwardly concave rigid part for completely blocking off said cross-section and lifting said pressing members out of said downwardly concave rigid part for permitting movement along said fluid passage conduit.

11. A multi-way valve as claimed in claim 10 in which said pressing means carrier comprises a vertical shaft in the center of said annular fluid passage conduit, a plurality of arms axially slidably and rotatably mounted on said vertical shaft and extending outwardly to said fluid passage conduit, said pressing members being mounted on the ends of said arms, at least two of said arms being spaced to have only two adjacent fluid conduit therebetween.

12. A multi-way valve as claimed in claim 7 in which said fluid passage means is an elastic fluid passage conduit having a hollow crosssection, and said pressing means comprise rollers having a flat profile and engaged with said fluid passage conduit for completely blocking off said cross-section and rolling along said fluid passage conduit.

13. A multi-way valve as claimed in claim 6 in which said fluid passage means is a rectilinear fluid passage means and said fluid conduits extend laterally therefrom.

14. A multi-way valve as claimed in claim 13 in which said pressing means comprise rollers engaged with said fluid passage means for completely blocking off said fluid passage means and rolling along said fluid passage means, and said pressing means carrier is a straight cam extending parallel to said fluid passage means and movable in the direction of its length.

* * * * *